(12) United States Patent
Miao et al.

(10) Patent No.: US 11,345,785 B2
(45) Date of Patent: May 31, 2022

(54) PROCESSING METHOD FOR INTELLIGENT HYDROGEL FROM NANOMETER STARCH PARTICLES

(71) Applicant: Jiangnan University, Wuxi (CN)

(72) Inventors: Ming Miao, Wuxi (CN); Bo Jiang, Wuxi (CN); Yang Qi, Wuxi (CN); Yao Liu, Wuxi (CN); Tao Zhang, Wuxi (CN); Zhengyu Jin, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 336 days.

(21) Appl. No.: 16/601,667

(22) Filed: Oct. 15, 2019

(65) Prior Publication Data

US 2020/0040144 A1    Feb. 6, 2020

Related U.S. Application Data

(63) Continuation of application No. PCT/CN2019/071757, filed on Jan. 15, 2019.

(30) Foreign Application Priority Data

Apr. 23, 2018 (CN) .......................... 201810368070.0

(51) Int. Cl.
*C08J 3/075* (2006.01)
*B82Y 40/00* (2011.01)

(52) U.S. Cl.
CPC ............... *C08J 3/075* (2013.01); *B82Y 40/00* (2013.01); *C08J 2303/02* (2013.01); *C08J 2489/00* (2013.01)

(58) Field of Classification Search
CPC ........................................................ C08J 3/075
See application file for complete search history.

(56) References Cited

FOREIGN PATENT DOCUMENTS

| CN | 1817182 | A |   | 8/2006 |
|---|---|---|---|---|
| CN | 102625662 | A |   | 8/2012 |
| CN | 105688827 | A | * | 6/2016 |
| CN | 106046311 | A | * | 10/2016 |
| CN | 108424942 | A |   | 8/2018 |
| CN | 108676177 | A |   | 10/2018 |
| KR | 20170060787 | A |   | 6/2017 |
| WO | 9815347 | A1 |   | 4/1998 |

* cited by examiner

*Primary Examiner* — Shaojia A Jiang
*Assistant Examiner* — Everett White
(74) *Attorney, Agent, or Firm* — IPRO, PLLC

(57) ABSTRACT

The present disclosure discloses a processing method for intelligent hydrogel from nano-scale starch particles, and belongs to the technical field of nutritional health food. The present disclosure uses dendritic water-soluble starch particles as a skeleton and utilizes a transglycosidation and chain extension-glycan entanglement reaction of glycosyltransferase to obtain an intelligent hydrogel having a spatial reticular structure. The product provided by the present disclosure is an intelligent starch-based hydrogel which has good rehydration capability, biocompatibility, strong gel strength, enzymatic response irreversibility, pH response reversibility, can carry multiple nutritional factors. The hydrogel provided by the present disclosure can protect and control the release of food functional factors, and can be applied to food, biological drug loading, functional materials and the like.

10 Claims, 3 Drawing Sheets

PROCESSING METHOD FOR INTELLIGENT HYDROGEL FROM NANOMETER STARCH PARTICLES

TECHNICAL FIELD

The disclosure herein relates to the field of a processing method for intelligent hydrogel from nano-scale starch particles, and belongs to the technical field of nutritional health food.

BACKGROUND

With people's awareness of health care increasing, the research and development of various types of nutritional health food emerge endlessly, and the demand for novel nutrient carrier materials is very urgent. Hydrogels, which are known for their biomimetic properties, are the main materials for biomedical applications such as drug delivery and stem cell therapy, and are often used in drug loading, tissue engineering, environmental protection and other aspects. Bio-based hydrogels have become a research hotspot because of regenerability, environmental friendliness, biocompatibility, good adsorption properties and other advantages, and have attracted extensive attention from researchers at home and abroad.

In recent years, research on bio-based hydrogels mostly involves protein-based hydrogels. Proteins have wide source and are natural hydrophilic polymers. For example, Gil et al. mixed gelatin with amorphous silk fibroin to synthesize a protein-based hydrogel. However, the protein-based hydrogel still has many disadvantages, such as poor mechanical properties and poor thermal stability. Based on this, more researchers have developed polysaccharide-based hydrogels applied to medical and health, food and cosmetics, agriculture and environmental protection and other fields from the perspective of polysaccharide macromolecules. The research and application of polymer polysaccharide hydrogels have developed rapidly in recent years, but the main research fields are still focused on biomedical aspects, and the research direction has gradually turned to improving the material properties, functional properties, gel formation mechanisms and functional material simulation of hydrogels. Therefore, the establishment of a novel intelligent starch-based hydrogel will expand the range of application of the hydrogel field.

At present, the preparation of starch-based hydrogels has developed to some extent, and all have changed to the preparation, application and other aspects of intelligent hydrogels. For example, Zhang Hongshan et al. studied tertiary amino starch-based pH-sensitive hydrogels. Hydroxyethyl starch was used as a raw material, and functionally modified to synthesize a tertiary amino-based pH-sensitive starch derivative, and the tertiary amino-based pH-sensitive starch derivative was used as a raw material to synthesize a series of tertiary amino starch-based pH-sensitive hydrogels. The preparation method has a complicated process, and the gel formation process requires a crosslinking agent, a catalyst, etc., which have certain toxicity. In addition, the preparation process determines the application range of the hydrogels, and the hydrogel cannot be enzymatically degraded, and is used for dye adsorption, environmental purification and the like. Kong Xiaofeng et al. developed a pH-sensitive porous hemicellulose hydrogel and drug release properties thereof. A hemicellulose grafted copolyacrylamide hydrogel having a porous structure was prepared by a free radical polymerization method using polyethylene glycol as a porogen. The hydrogel has a porous structure and pH value sensitivity, and can realize the controlled release of a drug. The porogen and the crosslinking agent play an important role in the formation of hydrogels. The amount of porogen PEG seriously affects the loading content of the hydrogels formed. The amount of crosslinking agent determines the gel strength of the gel. There are many controllable factors for gel formation.

SUMMARY

The inventors have conducted in-depth investigation and research on the prior art and studied the processing method of starch hydrogels. Finally, we have found an intelligent hydrogel processing method using nano starch particles as a skeleton. The present disclosure is provided based on the above findings.

An objective of the present disclosure is to provide an intelligent hydrogel processing method using nano starch particles as a skeleton, which is a novel material processing method capable of protecting functional active ingredients, improving bioavailability and enhancing a sustained release effect. The method has the advantages of a simple production process, an advanced technology and high safety. The prepared hydrogel product is an intelligent starch-based hydrogel which has good rehydration capability, biocompatibility, strong gel strength, enzymatic response irreversibility, pH response reversibility, can carry multiple nutritional factors, has a sustained release effect on nutrients, can be used to protect and control the release of food functional factors, and can be applied to food, biological drug loading, functional materials and the like.

The objectives of the present disclosure are achieved by the following technical scheme: a bio-preparation technology of a starch-based hydrogel suitable for protecting and regulating the release of functional substances is used to obtain an intelligent hydrogel having a spatial reticular structure, which uses biosynthesized starch particles or natural soluble plant starch as a raw material and utilize a transglycosidation and chain extension-glycan entanglement reaction of glycosyltransferase.

In an embodiment, the method for processing the nano-scale intelligent starch-based hydrogel includes:

(1) allowing water-soluble starch particles to be prepared into a homogeneous solution having a mass concentration of 0.2 to 1%;

(2) adding 50 to 100 mg of a donor molecule providing glucose and 50 to 200 U of glycosyltransferase per 10 mg of water-soluble starch particles, stirring evenly, reacting at a temperature of 35 to 40° C. for 12 to 24 h, then cooling and keeping stand to form a gel.

In an embodiment, the mass ratio of the donor molecule providing a glucose molecule to the water-soluble starch particles is (5 to 10):1.

In an embodiment, the method also includes: adding functional ingredients, including a water-soluble protein and a fat-soluble active substance, in a homogeneous solution system in step (1) or a reaction system in step (2).

In an embodiment, the water-soluble starch particles are derived from biosynthesized starch particles or natural plant starch, having a molecular weight of $10^7$ to $10^8$ g/mol, an α-1,6 glycosidic bond ratio of 7% to 10%, and a particle size of 30 to 100 nm.

In an embodiment, a method for preparing the biosynthesized starch particles can refer to the literature of In Vitro Synthesis of Hyperbranched α-Glucans Using a Biomimetic Enzymatic Toolbox. Florent Grimaud, etc. 2013, 14, 438-

447; or the literature of Physical properties and Structure of enzymatically synthesized amylopectin analogs-2. Jelena Ciric, etc, 2013, 65, 1061-1068.

In an embodiment, the natural plant starch includes potato starch, mung bean starch, corn starch, waxy corn starch, wheat starch, glutinous rice starch, rice starch, and the like.

In an embodiment, the donor molecule providing the glucose molecule is sucrose, maltodextrin or glucose-1-phosphate.

In an embodiment, the glycosyltransferase is non-Leloir-type glycosyltransferase recognizing a disaccharide or a short-chain glucan and the like.

In an embodiment, the processing method also includes: repeatedly rinsing a gel product formed by being kept standing in step (2) with water, and lyophilizing the gel product to obtain a xerogel.

A first objective of the present disclosure is to provide an intelligent response hydrogel or xerogel prepared according to the above method.

A second objective of the present disclosure is to provide a carrying system for functional ingredients, including the hydrogel provided by the present disclosure.

A third objective of the present disclosure is to provide application of the hydrogel in fields of food, medicine, daily chemicals and the like.

Beneficial results of the present disclosure:

1) As a renewable resource, the soluble starch particles have the characteristics of low cost, easy obtainment, degradability and the like. In addition, the present disclosure makes full use of China's resource-rich grain raw materials, which have a wide source and are not limited by the place of origin and seasons. The raw material of the present disclosure adopts biosynthesized starch particles or natural plant starch without tetramer polypeptide in animal glycogen, and the prepared starch-based hydrogel is enzymatically hydrolyzable, thereby overcoming the defects that the existing oyster glycogen hydrogel cannot be completely degraded because of containing polypeptide and a polypeptide chain entangled glycan destroys hydrogen-bond interaction in the gel to some extent to weaken the gel strength.

2) The hydrogel provided by the present disclosure has good rehydration capability, in which re-coagulation by water absorption can be repeated at least 5 times, good biocompatibility, enzymatic response irreversibility (α-amylase, glucoamylase, and β-amylase), pH response reversibility and other characteristics, and then a novel intelligent response starch-based hydrogel is developed. The enzymatically responsive intelligent response hydrogel can relieve a crosslinking structure in the environment of amylopsin and glucoamylase and release nutritional factors in the hydrogel; the gel strength of the intelligent response hydrogel is 235.67 g or more; a special structure formed by the intelligent response hydrogel can absorb multiple functional nutrients and has a sustained release effect. Therefore, in addition to protecting the stability of nutrients, the bioavailability and the like are also improved.

3) The present disclosure is simple and convenient in steps, easy to operate, controllable in reaction conditions, and relatively low in cost, and adopts a clean green production process, and has no pollution to the environment.

4) The product prepared by the present disclosure can protect and control the release of functional ingredients, including the water-soluble protein and the fat-soluble active substance, such as lysozyme, bovine serum albumin, conjugated linoleic acid, resveratrol, etc., and has a sustained release effect, can be applied to food, biological drug loading, functional materials and the like, and has very promising market prospects and broad economic benefits.

DETAILED DESCRIPTION

Figure 1:
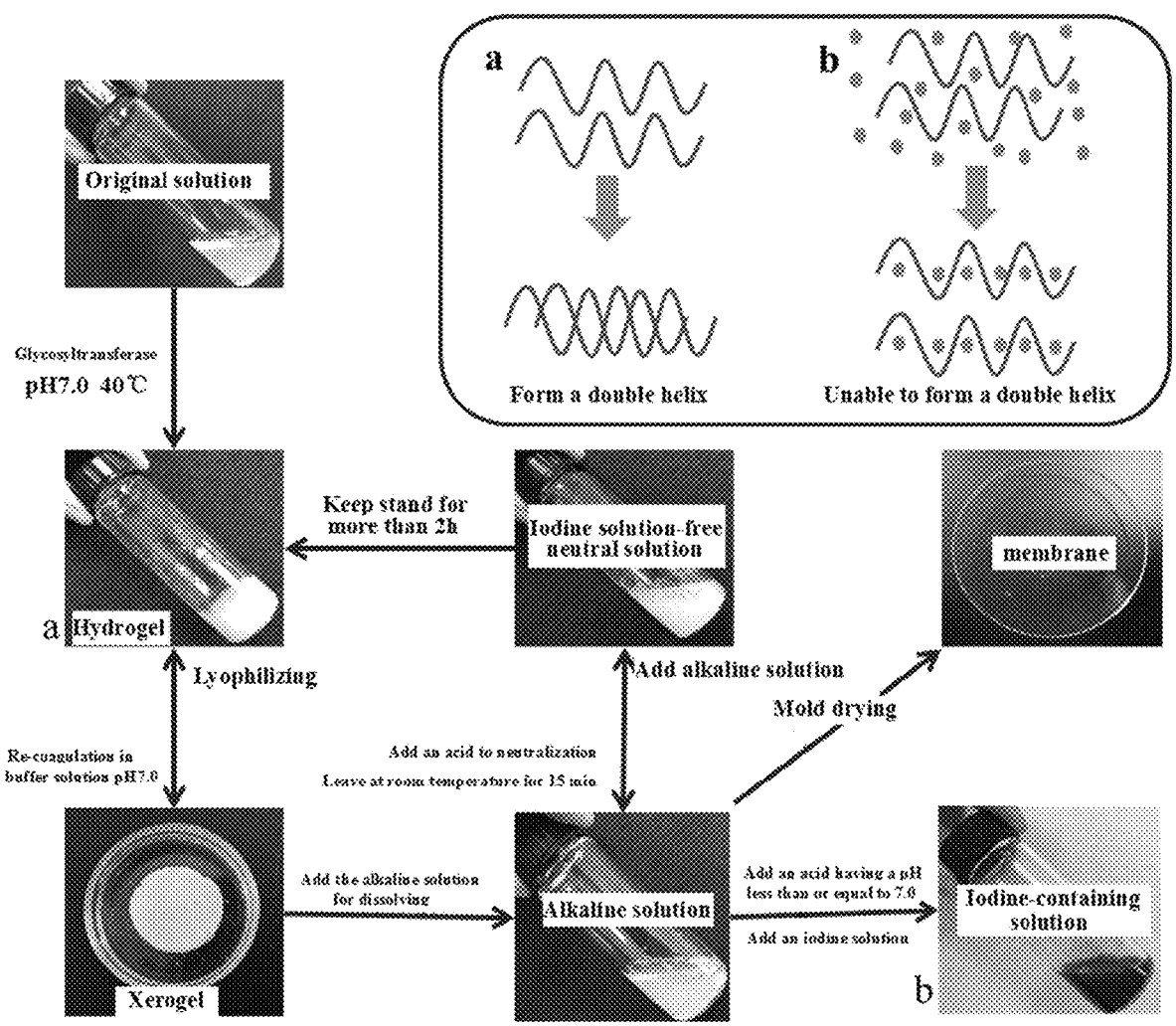
FIG. 1 is an evolution diagram of an intelligent response starch-based hydrogel provided by the present disclosure.

The content of the present disclosure will be further clarified below with reference to examples, but the content protected by the present disclosure is not only limited to the following examples.

Example 1

10.0 mg of natural corn starch (nano starch particles having an α-1,6 glycosidic bond ratio of 10%) was dissolved in a Tris-HCl buffer solution (50 mmol/L, pH 7.0) to be prepared into a homogeneous solution having a mass concentration of 0.2%. Gel formation reaction: the solution was ultrasonically treated for 15 min, and then 50 mg of a glucose-based maltodextrin donor molecule and 80 U of non-Leloir-type glycosyltransferase were continuously added and stirred evenly to react at a constant temperature of 40° C. for 24 h. The product was left at room temperature for 6 h and cooled, and kept standing to form a gel. The gel strength of an intelligent hydrogel is 235.67 g or more. A xerogel could be obtained by repeatedly rinsing with distilled water and lyophilizing. The xerogel could be re-coagulated by water absorption to repeatedly form the gel 5 times.

In the reaction of grafting and chain extension of starch particles, nutritional factors were added, that is, 10.0 mg of nano starch particles were dissolved in a buffer solution, and 50 mg of glucose-1-phosphate and 80 U of non-Leloir-type glycosyltransferase were successively added, and stirred evenly to react at a constant temperature of 40° C. under the condition of pH 7.0 for 24 h. Grafting and chain extension were completed, and 0.1 mg of conjugated linoleic acid dissolved in a small amount of ethanol was added to be mutually mixed and included, thereby forming a compound. The product could be accelerated to be generated by adding a 15% sodium chloride solution, and the carrier hydrogel was obtained by centrifugation, 50% alcohol washing and drying. The release rate of nutrients was 98.2% by the enzymatic reaction of the carrier hydrogel.

A determination method of the gel strength was as follows: the gel strength of the hydrogel was analyzed by a physical property analyzer; a determination method of the release rate of the nutrients after the enzymatic reaction was roughly as follows: the xerogel (1.5%, w/v) was taken and put in a phosphate buffer solution with pH of 7.0, 290 units/ml α-amylase, and 35 units/ml glucoamylase. The formula for the release rate of the nutrients was as follows:

Release rate %=Release amount/Load amount× 100%.

As shown in FIG. 1, it is an evolution diagram of an intelligent starch-based hydrogel at different states. The process was roughly as follows: after being catalyzed by the glycosyltransferase, the starch particles and a glucose donor molecule solution were subjected to grafting and chain extension, and grafting chains were mutually crosslinked and helically wound to form a spatial reticular structure, that is, the intelligent starch-based hydrogel. After the moisture in the reticular void structure was removed by lyophilization, the hydrogel will be dehydrated to form xerogel solid. The xerogel solid powder was dissolved in an alkaline solution, because the alkaline solution could destroy hydrogen bond interaction between the grafting chains. Then an acid was added to a transparent solution for neutralization. At this time, the solution was divided into two groups: firstly, when the pH of the solution reaches 7.0, an iodine solution was not added, the solution will first change from a transparent state to a turbid state and then was gradually re-coagulated into a hydrogel, hydroxyl ions in the solution were neutralized, a hydrogen bond was reformed, and a grafting long chain was re-coagulated by helical winding; secondly, when the solution was neutral, the iodine solution was added immediately. At this time, the solution turned dark blue, but still did not form the gel after being kept standing for a long time, because elemental iodine in the iodine solution could be coated by a long-chain single helix to form a straight chain-iodine compound, and a double helix could not be formed, that is, the gel could not be formed. It shows that the hydrogel provided by the present disclosure has pH response reversibility.

According to FIG. 1, prior to the enzymatic reaction, because the concentration of the nutritional factor-containing intelligent starch-based hydrogel in a dilute solution was poor, the nutritional factors penetrated into the solution from the surface of the hydrogel. With the enzymatic reaction going, the starch-based hydrogel was slowly hydrolyzed and the nutritional factors were slowly released from the hydrogel to last for 5 to 6 h. In addition to protecting the stability of nutrients, the bioavailability and the like were also improved. This also shows that the hydrogel provided by the present disclosure has a sustained release effect.

Figure 2:
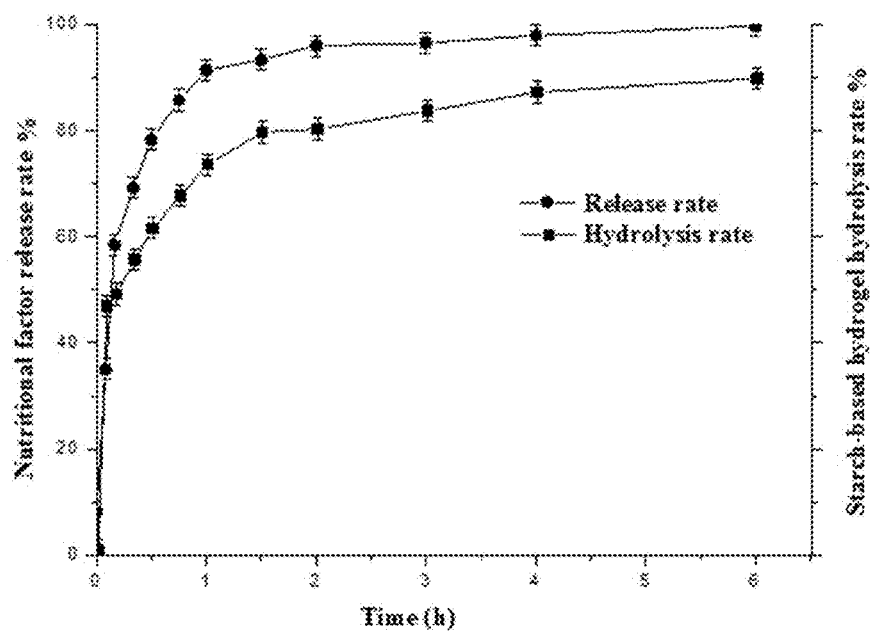
FIG. 2 is a hydrolysis rate of an intelligent starch-based hydrogel and a release rate of nutritional factors.

Meanwhile, the hydrogel provided by the present disclosure has an irreversible enzymatic response effect, and can relieve a crosslinking structure in the environment of amylopsin and glucoamylase and release the nutritional factors in the hydrogel, and the results are shown in FIG. 2.

Example 2

10.0 mg of enzymatically synthesized nano starch particles ($\alpha$-1,6 glycosidic bond ratio: 10%) was dissolved in a Tris-HCl buffer solution (50 mmol/L, pH 7.0) to be prepared into a homogeneous solution having a mass concentration of 0.5%. Gel formation reaction: the solution was ultrasonically treated for 20 min, and then 80 mg of a glucose-based sucrose donor molecule and 100 U of non-Leloir-type glycosyltransferase were continuously added and stirred evenly to react at a constant temperature of 40° C. for 24 h. The product was left at room temperature for 6 h and cooled, and kept standing to form a gel. The gel strength of an intelligent hydrogel was 358.38 g. The release rate of nutrients was 97.7% by the enzymatic reaction. A xerogel could be obtained by repeatedly rinsing with distilled water and lyophilizing. The xerogel could be re-coagulated by water absorption to repeatedly form the gel 5 times.

The preparation method of enzymatically synthesized nano starch particles could refer to the literature of In Vitro Synthesis of Hyperbranched $\alpha$-Glucans Using a Biomimetic Enzymatic Toolbox. Florent Grimaud, etc. 2013, 14, 438-447.

Example 3

10.0 mg of natural nano potato starch particles ($\alpha$-1,6 glycosidic bond ratio: 10%) was dissolved in a Tris-HCl buffer solution (50 mmol/L, pH 7.0) to be prepared into a homogeneous solution having a mass concentration of 1.0%. Gel formation reaction: the solution was ultrasonically treated for 30 min, and then 100 mg of a glucose-based glucose-1-phosphate donor molecule and 200 U of non-Leloir-type glycosyltransferase were continuously added and stirred evenly to react at a constant temperature of 40° C. for 24 h. The product was left at room temperature for 6 h and cooled, and kept standing to form a gel. The gel strength of an intelligent hydrogel was 397.21 g. The release rate of nutrients was 97.1% by the enzymatic reaction. A xerogel could be obtained by repeatedly rinsing with distilled water and lyophilizing. The xerogel could be re-coagulated by water absorption to repeatedly form the gel 6 times.

Example 4: Effects of Different Amounts of Glucose Donor Molecules on Hydrogel

On the basis of Example 1, the addition amounts of a glucose-based donor molecule were changed, and the effects of the amounts of the glucose donor molecules on the hydrogel were studied as follows specifically:

10.0 mg of natural nano corn starch particles were dissolved in a Tris-HCl buffer solution (50 mmol/L, pH 7.0) to be prepared into a homogeneous solution having a mass concentration of 0.2%. Gel formation reaction: the solution was ultrasonically treated for 15 min, and then the glucose-based maltodextrin donor molecule (10 mg, 20 mg, 30 mg, 40 mg, 50 mg, 60 mg, 70 mg, 80 mg, and 100 mg, respectively) and 80 U of non-Leloir-type glycosyltransferase were continuously added and stirred evenly to react at a constant temperature of 40° C. for 24 h. The product was left at room temperature for 6 h and cooled, and kept standing.

The results show that when the glucose donor molecule was added in an amount of 20 mg or less, the hydrogel cannot be formed; when the glucose-based donor molecule was added in an amount of 20 to 50 mg, the hydrogel can be formed, but the gel strength is only 20 to 150 g; when the glucose-based donor molecule was added in an amount of 50 mg or more, the gel strength is more than 200 g.

Figure 3:
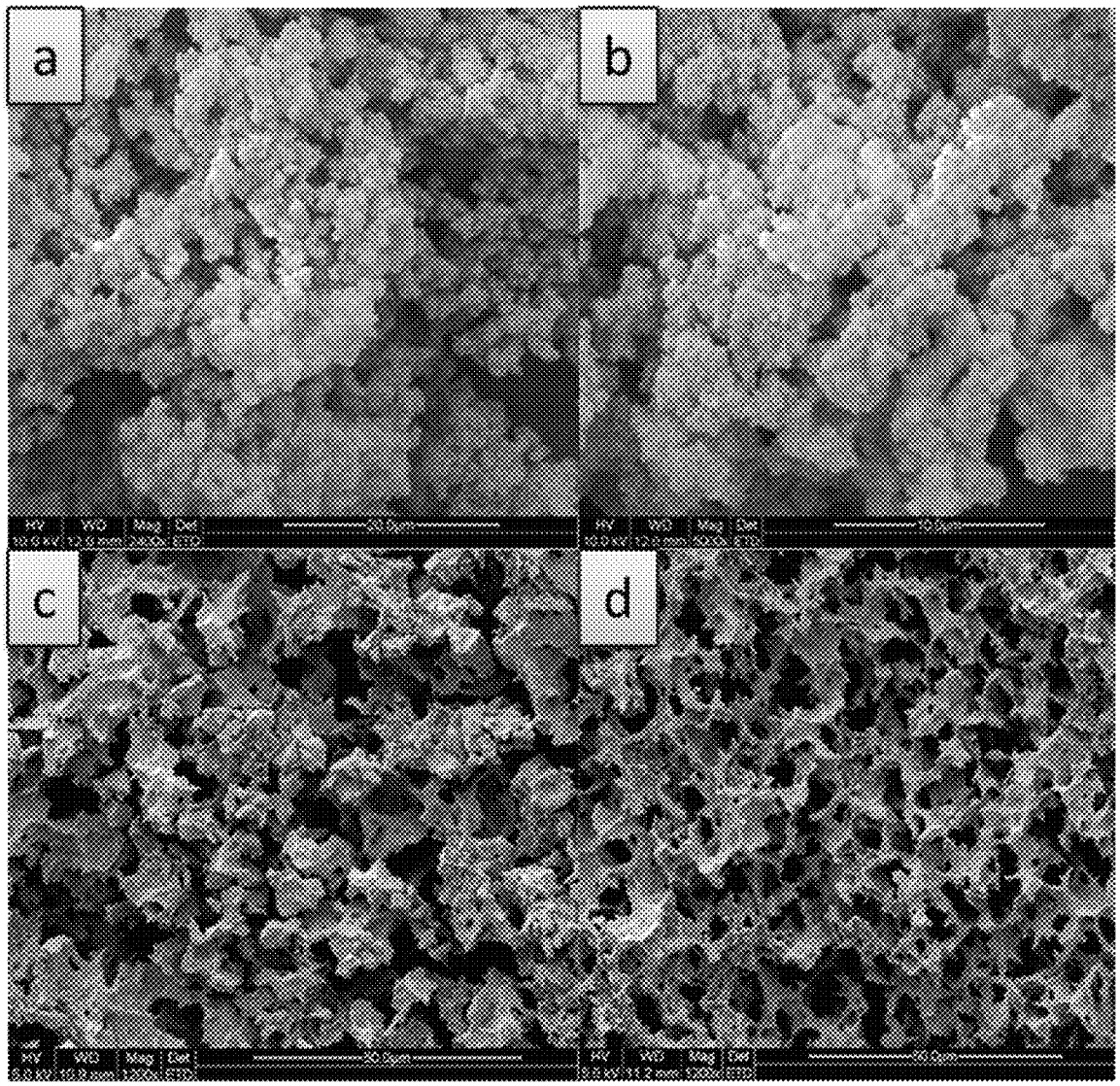
FIG. 3 is a scanning electron micrograph of a xerogel.

As shown in FIG. 3, FIG. 3 is a scanning electron micrograph of the starch-based hydrogel, and FIG. 3a and FIG. 3c are scanning electron micrographs of a hydrogel double fixation method and a xerogel gold plating method of Example 3; FIG. 3b and FIG. 3d are scanning electron micrographs of the hydrogel double fixation method and the xerogel gold plating method of Example 1. As can be seen from Figures, a gel void formed in Example 3 is relatively large because a longer grafted straight chain structure is formed.

Example 5

Referring to Example 1, nano starch particles having the $\alpha$-1,6 glycosidic bond ratio of 10% were replaced with amylose, and other conditions were unchanged. As a result, a solution system having gel properties could not be obtained, the related linear glycans were easily and mutually entangled, and finally an insoluble substance was formed by double helix recrystallization, although a related helical hydrophobic cavity has a certain loading performance.

What is claimed is:

1. A method for processing an intelligent hydrogel using nano-scale starch particles as a skeleton, comprising:

(1) allowing water-soluble starch particles to be prepared into a homogeneous solution having a mass concentration of 0.2 to 1%; and (2) adding 50 to 100 mg of donor molecules for providing glucose and 50 to 200 U of glycosyltransferase per 10 mg of the water-soluble starch particles, stirring evenly, reacting at a temperature of 35 to 40° C. for 12 to 24 h, then cooling and leaving to stand to form a gel, wherein the water-soluble starch particles are derived from biosynthesized starch particles or natural plant starch, and have a molecular weight of $10^7$ to $10^8$ g/mol, an α-1,6 glycosidic bond ratio of 7% to 10%, and a particle size of 30 to 100 nm; and wherein the donor molecules for providing the glucose are sucrose, maltodextrin or glucose-1-phosphate.

2. The method according to claim 1, further comprising: adding functional ingredients comprising a water-soluble protein into a homogeneous solution system in step (1) or a reaction system in step (2).

3. The method according to claim 1, wherein the glycosyltransferase is non-Leloir-type glycosyltransferase recognizing a disaccharide or a short-chain glucan.

4. The method according to claim 1, further comprising: repeatedly rinsing a gel product formed by being left to stand in step (2) with water, and lyophilizing the gel product to obtain a xerogel.

5. A method for processing an intelligent hydrogel using nano-scale starch particles as a skeleton, comprising:

(1) allowing water-soluble starch particles to be prepared into a homogeneous solution having a mass concentration of 0.2 to 1%;

(2) adding 50 to 100 mg of donor molecules for providing glucose and 50 to 200 U of glycosyltransferase per 10 mg of the water-soluble starch particles, stirring evenly, reacting at a temperature of 35 to 40° C. for 12 to 24 h, then cooling and leaving to stand to form a gel; and wherein the donor molecules for providing the glucose are sucrose, maltodextrin or glucose-1-phosphate.

6. The method according to claim 5, wherein a mass ratio of the donor molecules for providing the glucose to the water-soluble starch particles is (5 to 10):1.

7. The method according to claim 5, further comprising: adding functional ingredients comprising a water-soluble protein into a homogeneous solution system in step (1) or a reaction system in step (2).

8. The method according to claim 5, wherein the water-soluble starch particles are derived from biosynthesized starch particles or natural plant starch, and have a molecular weight of $10^7$ to $10^8$ g/mol, an α-1,6 glycosidic bond ratio of 7% to 10%, and a particle size of 30 to 100 nm.

9. The method according to claim 5, wherein the glycosyltransferase is non-Leloir-type glycosyltransferase recognizing a disaccharide or a short-chain glucan.

10. The method according to claim 5, further comprising: repeatedly rinsing a gel product formed by being left to stand in step (2) with water, and lyophilizing the gel product to obtain a xerogel.

* * * * *